(12) United States Patent
Mueggenberg et al.

(10) Patent No.: US 7,242,682 B1
(45) Date of Patent: Jul. 10, 2007

(54) HARDWARE FRAME MODIFIER APPARATUS AND METHOD FOR STORAGE VIRTUALIZATION

(75) Inventors: Timothy John Mueggenberg, Coon Rapids, MN (US); Christopher J. Van Krevelen, Coon Rapids, MN (US); Atiq Ahamad, Maplegrove, MN (US)

(73) Assignee: Storage Technology Corporation, Louisville, CO (US)

( * ) Notice: Subject to any disclaimer, the term of this patent is extended or adjusted under 35 U.S.C. 154(b) by 1042 days.

(21) Appl. No.: 10/267,378

(22) Filed: Oct. 9, 2002

(51) Int. Cl.
*H04L 12/28* (2006.01)
(52) U.S. Cl. .................. 370/389; 370/392; 370/401
(58) Field of Classification Search ......... 370/389, 370/390, 465, 470, 506, 509, 392, 401–404; 711/114, 162, 170, 163, 111, 207; 709/224, 709/225
See application file for complete search history.

(56) References Cited

U.S. PATENT DOCUMENTS

| | | | |
|---|---|---|---|
| 3,942,155 A | 3/1976 | Lawlor | 340/172.5 |
| 4,833,603 A | 5/1989 | Morganti et al. | 364/200 |
| 5,175,818 A | 12/1992 | Kunimoto et al. | 395/200 |
| 5,388,244 A | 2/1995 | Brent et al. | 395/400 |
| 5,448,564 A | 9/1995 | Thor | 370/94.1 |
| 6,144,668 A | 11/2000 | Bass et al. | 370/401 |
| 6,185,214 B1 | 2/2001 | Schwartz et al. | 370/401 |
| 6,246,683 B1 | 6/2001 | Connery et al. | 370/392 |
| 6,272,134 B1 | 8/2001 | Bass et al. | 370/390 |
| 6,317,805 B1 | 11/2001 | Chilton et al. | 710/129 |
| 6,418,488 B1 | 7/2002 | Chilton et al. | 710/20 |
| 6,427,171 B1 | 7/2002 | Craft et al. | 709/230 |
| 7,047,359 B1* | 5/2006 | Van Krevelen et al. | 711/114 |
| 2003/0172149 A1* | 9/2003 | Edsall et al. | 709/224 |
| 2004/0010618 A1* | 1/2004 | Thomas | 709/245 |
| 2004/0030857 A1* | 2/2004 | Krakirian et al. | 711/206 |

FOREIGN PATENT DOCUMENTS

| | | |
|---|---|---|
| JP | 10-285221 | 10/1998 |
| JP | 10-341251 | 12/1998 |
| WO | WO 01/50259 | 7/2001 |

* cited by examiner

*Primary Examiner*—Chau Nguyen
*Assistant Examiner*—Kenneth Hartmann, II
(74) *Attorney, Agent, or Firm*—Brooks Kushman P.C.

(57) ABSTRACT

A hardware frame modifier apparatus where the functions of the virtual device and virtual host are combined so that a single processor may perform them is provided. The hardware frame modifier apparatus may virtualize command and status frames without a store and forward operation. The modified command and status frames are sent to the physical host and physical device. The hardware frame modifier apparatus used a virtual table, updated by the virtual device/virtual host, to determine the appropriate mapping of the logical storage device of the frames to a physical storage device. Based on this mapping, the hardware frame modifier changes the frame header to direct the frame directly to the physical storage device and to determine the appropriate conversion of command and status type. In this way, the number of store and forward operations required to send data frames to, or read from, the physical storage devices is reduced or eliminated, thus reducing the delay or latency.

13 Claims, 4 Drawing Sheets

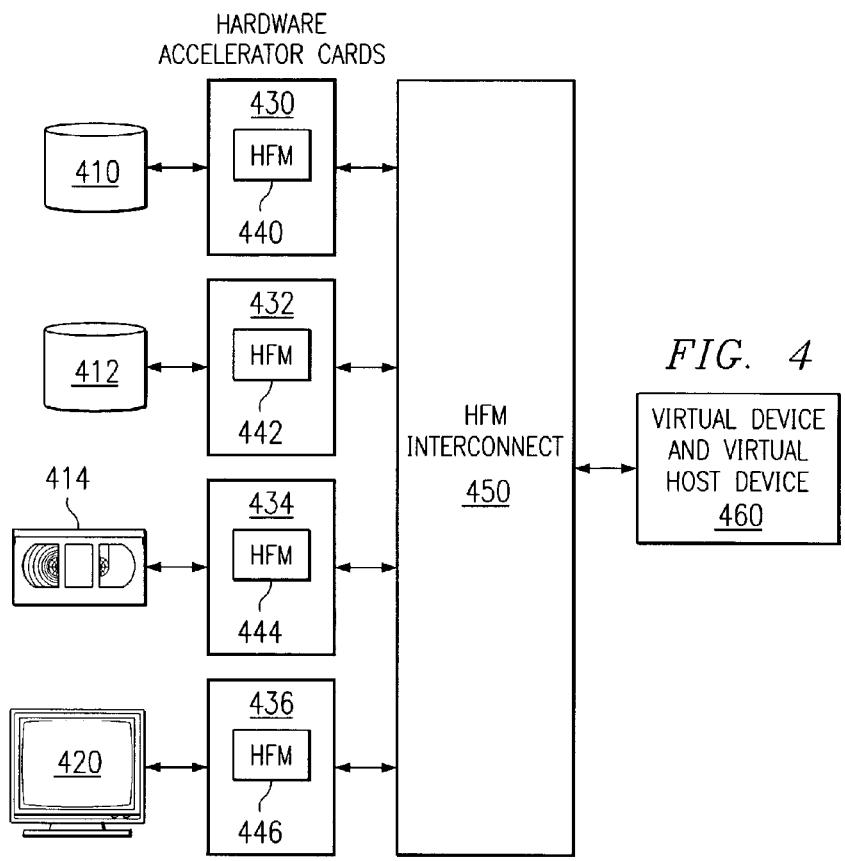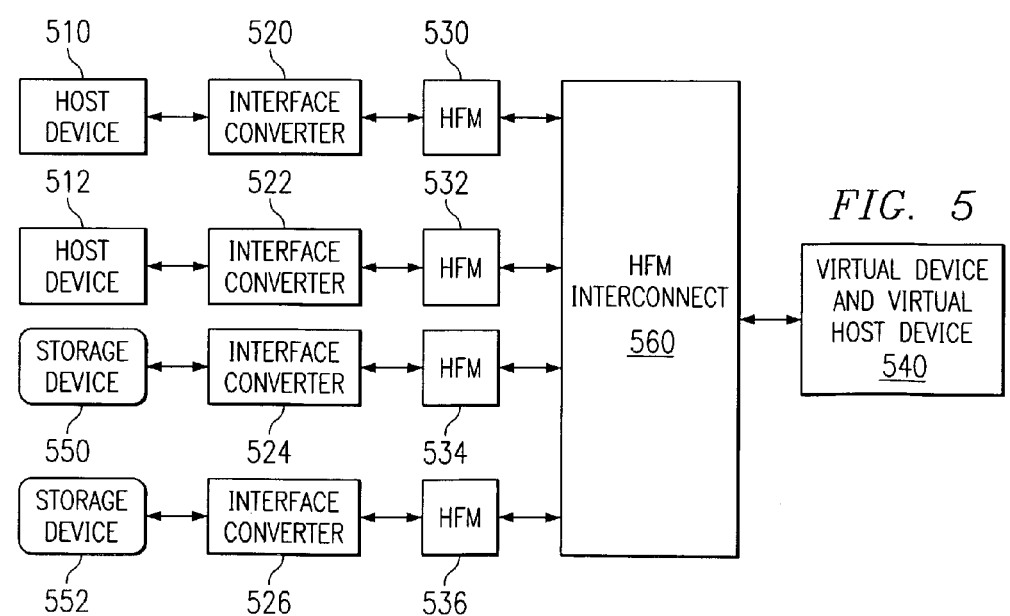

HARDWARE FRAME MODIFIER APPARATUS AND METHOD FOR STORAGE VIRTUALIZATION

BACKGROUND OF THE INVENTION

1. Field of the Invention

The present invention relates to an apparatus and method for modifying frames in hardware to implement storage device virtualization.

2. Background of the Invention

Storage virtualization is the treating of storage as a single logical entity without regard to the hierarchy or type of physical media that may be involved in the defining of the logical entity. That is, a single logical storage entity may be comprised of a plurality of physical storage devices but to all applications, the plurality of physical storage devices still appear to be a single large storage device. Storage virtualization enables the applications to be written to a single programming interface rather than to the details of the various disk, tape and optical devices that are used to store data.

FIG. 1 illustrates an exemplary prior art mechanism for storing and reading data from a storage device that is the subject of virtualization. As shown in FIG. 1, the system comprises a host device 110, a virtual device 120, a virtual host 130, and a physical storage device 140. With the storage and reading of data from the physical storage device, three phases are performed: the command phase, status phase, and data in/out phase. The command phase involves the passing of command frames to the storage device 140 commanding the storage device 140 to prepare for the storage or reading of data. The status phase involves sending and receiving status frames to and from the storage device 140 to verify that the storage device is reading for storage or reading of data. The data in/out phase involves the actual transfer of data between the storage device 140 and the host device 110.

As shown in FIG. 1, the command, status and actual data frames all experience similar paths. That is, command and data in frames are sent from the host device 110 to the physical storage device 140 via the virtual device 120 and the virtual host 130. At the virtual device 120, the frames are stored and then forwarded to the virtual host device 130. At the virtual host 130, the frames are again stored before being forwarded to the storage device 140 (see steps 1–3).

This same store and forward approach is taken on status and data out frames on the return path. Status and data out frames from the storage device 140 are sent to the host device 110 via the virtual host 130 and the virtual device 120 (see steps 4–6). Depending upon the type of frame, different operations occur as the frames are sent via virtual device 120 and virtual host 130.

The virtual device 120 communicates to the host device 110 in its chosen protocol. Similarly, the virtual host 130 communicates to the storage device in its chosen protocol. The virtual device 120 and virtual host 130 perform the necessary mappings and protocol conversions to map a virtual or logical storage entity to physical device 140.

For example, the host device's commands could be a disk protocol, while the storage device's command 140 are a tape protocol. Also, the host device could be accessing one logical disk while the physical storage devices are a tape pool. The host device 110 sends a command frame to the virtual device 120. Virtual device 120 translates host's command protocol into a proprietary protocol known by the virtual device 120 and the virtual host 130. The proprietary command is sent to the virtual host 130. Virtual host 130 receives the proprietary command and translates it into the storage's command protocol.

When the data is transferred from the host device 110 to storage device 140, or vice versa, the data is stored and forwarded at both virtual device 120 and virtual host 130. When the storage device 140 responds with status, virtual host 130 translates the status into a proprietary protocol before sending it to virtual device 120. Virtual device 120 translates the proprietary protocol into host device's protocol before sending it to host device 110.

During this whole sequence, host device 110 may store data to logical storage device entity "F:" but "F:" may be comprised of a plurality of actual physical storage devices of which storage device 140 may be one. The virtual device 120 maps the logical storage device entity "F:" to a plurality of storage devices handled by the virtual host 130 and forwards the data frame to the virtual host 130. The virtual host 130 maps the logical storage device entity "F:" to storage device 140.

Thus, with the known system described above, each store and forward adds delay or latency between the physical host device 110 and the physical storage device 140. This latency slows down the performance of the system by delaying the data, commands, and status frames sent to and from the storage device 140. Each delay forces the host device 110 to wait for its response from the storage device 140. Since no data is sent to the storage device 140 while the host device 110 waits for a response, the wait time is equated to wasted bandwidth and poor performance.

Therefore, it would be desirable to have an apparatus and method for performing storage virtualization in which delay and latency is reduced. Moreover, it would be desirable to have an apparatus and method in which the store and forward operations of the known system are minimized in order to reduce this delay and latency.

SUMMARY OF THE INVENTION

The present invention provides a hardware frame modifier apparatus and method for storage virtualization. With the apparatus and method, the functions of the virtual device and virtual host are combined so that a single processor may perform them. The hardware frame modifier apparatus may virtualize command and status frames without a store and forward operation. The modified command and status frames are sent to the physical host and physical device. The virtual device/virtual host sends table entry information to the hardware frame modifier.

The hardware based frame modifier apparatus uses the table entry information to determine the appropriate mapping of the logical storage device of the frames to a physical storage device. Based on this mapping, the hardware based frame modifier changes the frame header to direct the frames directly to the physical storage device or the physical host without having to be sent to the virtual device/virtual host. The hardware based frame modifier apparatus also uses the table entry information to determine the appropriate conversion of command and status type.

In this way, the number of store and forward operations required to send data frames to, or read from, the physical storage devices is reduced or eliminated. As a result, the amount of delay or latency in the operation is reduced. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram of a storage system in which hardware frame modifiers are used in accordance with the present invention;

FIG. 5 is an exemplary diagram of an alternative Fiber Channel based storage system in accordance with the present invention.

DETAILED DESCRIPTION OF THE PREFERRED EMBODIMENT

Figure 2:
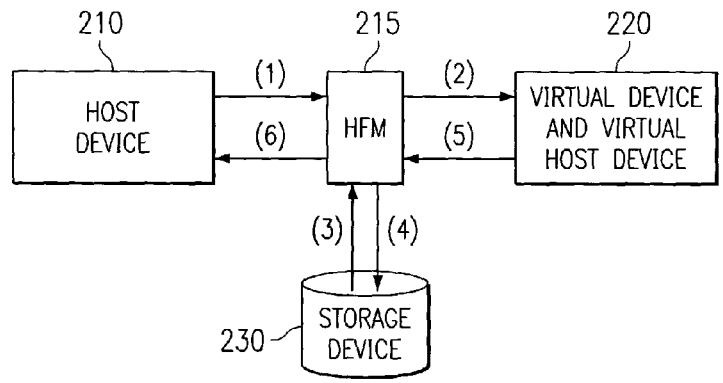
FIG. 2 is an exemplary diagram of a methodology for implementing storage virtualization using the present invention.

Referring now to the figures, and more specifically to FIG. 2, an exemplary diagram of a methodology for implementing storage virtualization using the present invention is depicted. As shown in FIG. 2, the host device 210 sends command and data frames to the hardware frame modifier (HFM) 215, (1). The HFM 215 decides whether to forward HFM-altered command or data frames to the storage device 230 (4) or forward un-altered frames to the virtual host & virtual device 220 (2). The factors used in making the determination as to whether to forward an altered command or data frame or an un-altered command or data frame are discussed in greater detail hereafter.

Figure 1:
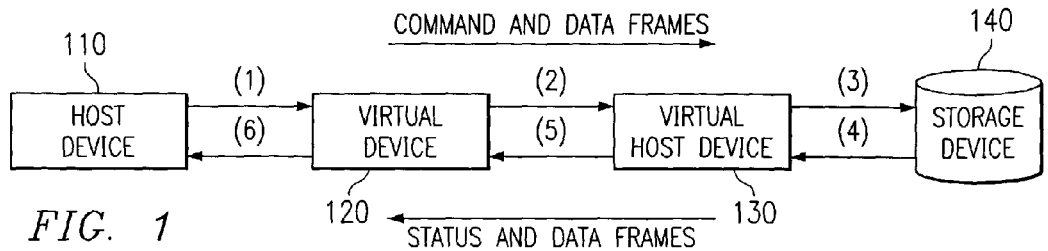
FIG. 1 is an exemplary diagram of a prior art methodology for implementing storage virtualization.

The combination of the HFM 215 with the virtual host & virtual device 220 replaces the plurality of processors as in the prior art methodology shown in FIG. 1. If the virtual host and virtual device 220 alters the command, it forwards altered command to the storage device 230 via the HFM 215 (5, 4). The HFM 215 is a pass through path in this case (5, 4).

During a data in/out phase, the data frames are streamed through the HFM 215. The HFM 215 alters the data frames and forwards the data directly to the destination. The data-in path follows links 1 and 4, while the data-out path follows links 3 and 6. This bypasses all store and forward operations of the virtual device and virtual host 220.

The HFM 215 acts as a bump in the communication link between the host device 210 and the storage device 230. That is, the frame will only be delayed a small amount of time while the hardware frame modifier modifies the frame. This process will not slow down the bandwidth of the link. The HFM 215 modifies the data frame in such a way as to implement address conversion virtualization of both the storage device and the host device.

During the status phase, the storage device 230 sends status frames to the HFM 215 via path 3. The HFM 215 decides whether to forward HFM-altered status frames to the host device 210 (6) or forward un-altered status frames to the virtual host & virtual device 220 (2). The factors used in making the determination as to whether to forward an altered status frame or an un-altered status frame are discussed in greater detail hereafter.

If the virtual host and virtual device 220 alters the status, it forwards altered status to the host device 210 via the HFM 215 (5, 6). The HFM 215 is a pass through path in this case (5, 6).

The HFM 215 determines when to modify frames based on the contents for the frame. For example, command frames may pass through the HFM 215 un-altered and become switched to the virtual device and virtual host 220 for conversion. A data frame, however, will undergo modification based on a mapping of logical addresses to physical addresses of the storage device 230.

The determination as to whether a frame is command frame, status frame or data frame may be made based on header information of the frame. The HFM 215 may extract information from the header of the frame to identify the frame as either a command, status or data frame. The particular information used for this purpose may be based on the particular communication protocol used. For example, in the Fiber Channel protocol, the header information includes a routing control word and type field that may be used to identify the frame as either a command, status or data frame.

The HFM 215 may perform frame modification based on a virtualization table. This virtualization table may be stored within the HFM 215 or may be in a separate device with which the HFM 215 has a communication link. The virtualization table is a lookup table that stores the mappings of the virtual addresses to the physical addresses of the host device 210 and the storage device 230. When a data frame is received by the HFM 215, the virtualization table is consulted based on the received address in the header of the data frame to determine the replacement address to which the data is written to or read from. The HFM 215 then modifies the header of the data frame in either direction to reflect the physical address of the data. The modified data frame is then output to be routed to the physical address that may be the storage device 230 or the host device 210 depending upon data direction. Any additional routing decisions to be made after the modified data leaves the HFM 215 are made on the replaced header information.

The present invention differs from known virtualization mechanisms in a number of important ways. For example, the present invention replaces source and destination addresses in a frame while known virtualization mechanisms make routing decisions based on addresses but do not replace the addresses. The present invention makes decisions based on frame type. Known virtualization mechanisms route all frame types with the same address in the same manner.

The present invention replaces command and status frames based on source and destination addresses as the command or status frame is on route to the destination. Current command and status frame virtualization is done at a virtual host or virtual device after the command or status frame is stored in memory. The command or status frame header is stripped from the payload and a replacement command or status frame is rebuilt from a new header.

In addition, the present invention replaces the source and destination address as the data frame is on route to the destination. Current virtualization is done at a virtual host or virtual device after the frame is stored in memory. The replacement frame is forwarded. The HFM replaces only the portions of the data frame that need to be replaced to perform virtualization. The known virtualization mechanisms strip the entire header from the payload and rebuild a new header for each payload.

Figure 3:
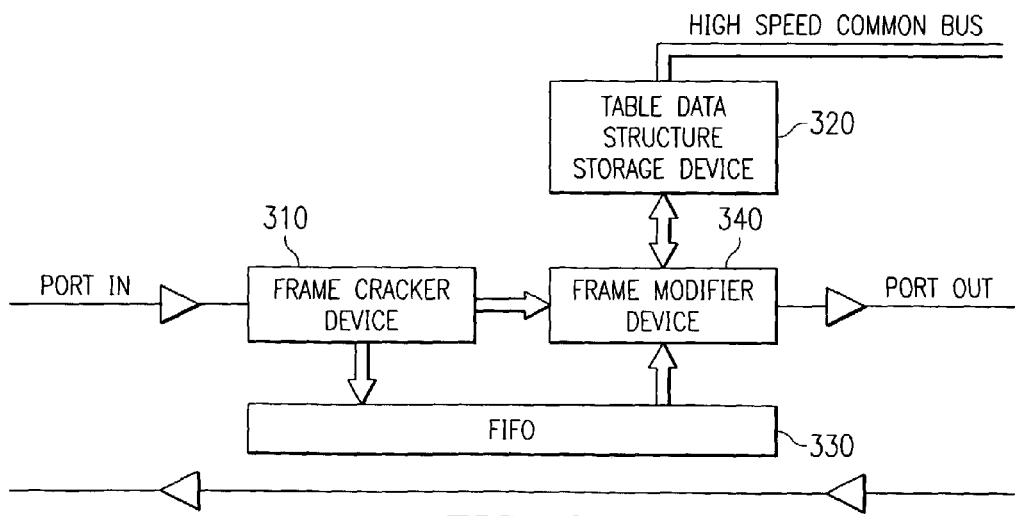
FIG. 3 is an exemplary diagram illustrating the flow of data through a hardware frame modifier according to the present invention.

FIG. 3 is an exemplary diagram illustrating the flow of data through a hardware frame modifier according to the present invention. As shown in FIG. 3, the HFM includes a frame cracker device 310, a table data structure storage device 320, a first-in-first-out (FIFO) device 330 and a frame modifier device 340. For command frames, the HFM may replace a host command type to the device command type and change the frame's source and destination address. For data frames, the HFM generates a new frame by replacing the original frame's source and destination address. For status frames, the HFM may replace a device status type to the host status type and change the frame's source and destination address.

Conversion is only necessary when the HFM receives a frame on the "port in" port. No conversion is necessary for data received on the "port out" port, since conversion would have already occurred on another HFM's "port in" port. This pass through path is depicted as the lower wire shown in FIG. 3.

When a frame is received, the frame cracker device 310 reads the frame header to determine the frame type. The frame cracker 310 parses the frames into categories, such as command, status, data, and other frame types. The frame cracker device 310 also reads the frame header to determine the virtual address referenced in the frame header. This information is provided to the frame modifier device 340. The frame is then stored in the FIFO 330. The frame modifier device 340 decodes the frame cracker device's frame type information and performs a different set of tasks depending upon the frame type.

If the HFM does not support command or status translation, the command and status frames are forwarded to the virtual device and virtual host for translation. Otherwise, the HFM will attempt to translate command and status frames.

When the frame cracker decodes a command type, the frame modifier device 340 performs a command translation check. If the command can be translated, the frame modifier device 340 replaces the original command with the appropriate command for the physical storage device. For example, if the frame modifier device 340 received a tape write command, but the storage device is a hard disk, the frame modifier device 340 may replace the original command with a disk write command. If the command cannot be type translated, the frame modifier device 340 forwards the command frame to the virtual device and virtual host device where the translation is performed. A similar methodology is followed for translating status.

Independent of frame type, the frame modifier device also performs a lookup of the virtual addresses in the table data structure of the table data structure storage device 320, deletes the current source and destination address, and replaces the frame header's source and destination address to reflect the physical addresses to which the virtual addresses are mapped. In effect, the frame is rebuilt on route to the destination.

If the virtual address is not present in the table data structure, the frame modifier device forwards the frame to the virtual device and virtual host device, where the address and, if necessary, type translation is performed. After the frame modifier device 340 alters the frame, it outputs the modified frame to the output port.

The HFM may be provided with a high-speed common bus connection through which the table data structure in the table data structure storage device 320 may be updated. Referring back to FIG. 2, this common bus connection may be used, for example, by the virtual device and virtual host device 220 to update the table data structure in the HFM 215.

For example, when the virtual device/virtual host device 220 receives a frame from the HFM 215, it means that the HFM 215 was unable to translate it. The virtual device/virtual host device 220 performs the necessary translations and transmits these frames to the appropriate destination, e.g. host device 210 or storage device 230.

After the virtual device/virtual host device 220 performs an address translation, it sends the address translation entry to the table data structure storage device 320 of the HFM 215 via the high speed common bus. The table data structure storage device 320 checks its table entries to determine if the new address translation entry is present in the table. If the new address translation is present in the table, the table data structure storage device 320 updates the entry in the table to reflect this new address translation.

If the new address translation entry is absent from the table, the table data structure storage device 320 adds a new entry to the table for this new address translation. If the address table is filled with entries, the new entry replaces the oldest entry in the table. The oldest entry is determined by using a least recently used algorithm. The least recently used algorithm identifies the oldest entry based on a last used indicator associated with each table entry.

Thus for command and status frames, the HFM may translate the frame type, virtual address and physical address of the frame. For translated command and status frames, the HFM acts as a bump in the wire causing slight delay that does not appreciably affect the bandwidth or latency of the storage system. For un-translated command and status frames, the virtual host and virtual storage device performs a single store and forward.

For data frames, the HFM translates the virtual address and physical address. The HFM acts as a bump in the wire causing slight delay that does not appreciably affect the bandwidth or latency of the storage system.

FIG. 4 is an exemplary diagram of a storage system in which hardware frame modifiers are used in accordance with the present invention. As shown in FIG. 4, the host device 420 may see a plurality of storage devices 410–412 as a single storage device through virtualization. The storage devices 410–414 may be of the same or different types, including hard drive storage devices, magnetic tape storage devices, CD or DVD based storage devices, and the like.

The storage devices 410–414 and the host device 420 are coupled to a HFM Interconnect 450 via hardware accelerator cards 430–436. The hardware accelerator cards 430–436 have hardware frame modifiers 440–446 associated with them in accordance with the present invention.

Command and status frames are passed between the storage devices 410–414 and the host device 420. These frames are translated either by the HFM 440–446 or the virtual host and virtual device 460. Command and status frames translated by the HFM 440–446 are slightly delayed, while frames translated by the virtual host and virtual device 460 are stored and forwarded. However, data frames are modified by the HFMs 440–446 before being passed to the HFM Interconnect 450.

Thus, the HFMs 440–446 modify frames so that the HFM Interconnect 450 can route the frames directly to the storage devices 410–414 or the host device 420 without having to use a store and forward approach by involving the virtual host and virtual device 460. Essentially, the HFMs 440–446 enable a bypass of the virtual host and virtual device 460.

FIG. 5 is an exemplary diagram of an alternative storage system in accordance with the present invention. The elements 510–512, 530–536, 540, 550–552 and 560, are similar to elements depicted in FIG. 4. The diagram in FIG. 5 contains interface converters 520–526 which are not present in the embodiment depicted in FIG. 4. The interface converters 520–526 translate the interface protocol operating on the link with the host device 510, 512 or storage device 550, 552, to a standard interface operating on the HFMs 530–536. This allows the HFMs 530–536 to operate with different interfaces. Thus, in this embodiment, an additional layer of processing is provided between the host devices 510–512 and the storage devices 550–552 to allow for different communication protocols to be used.

Figure 6A:
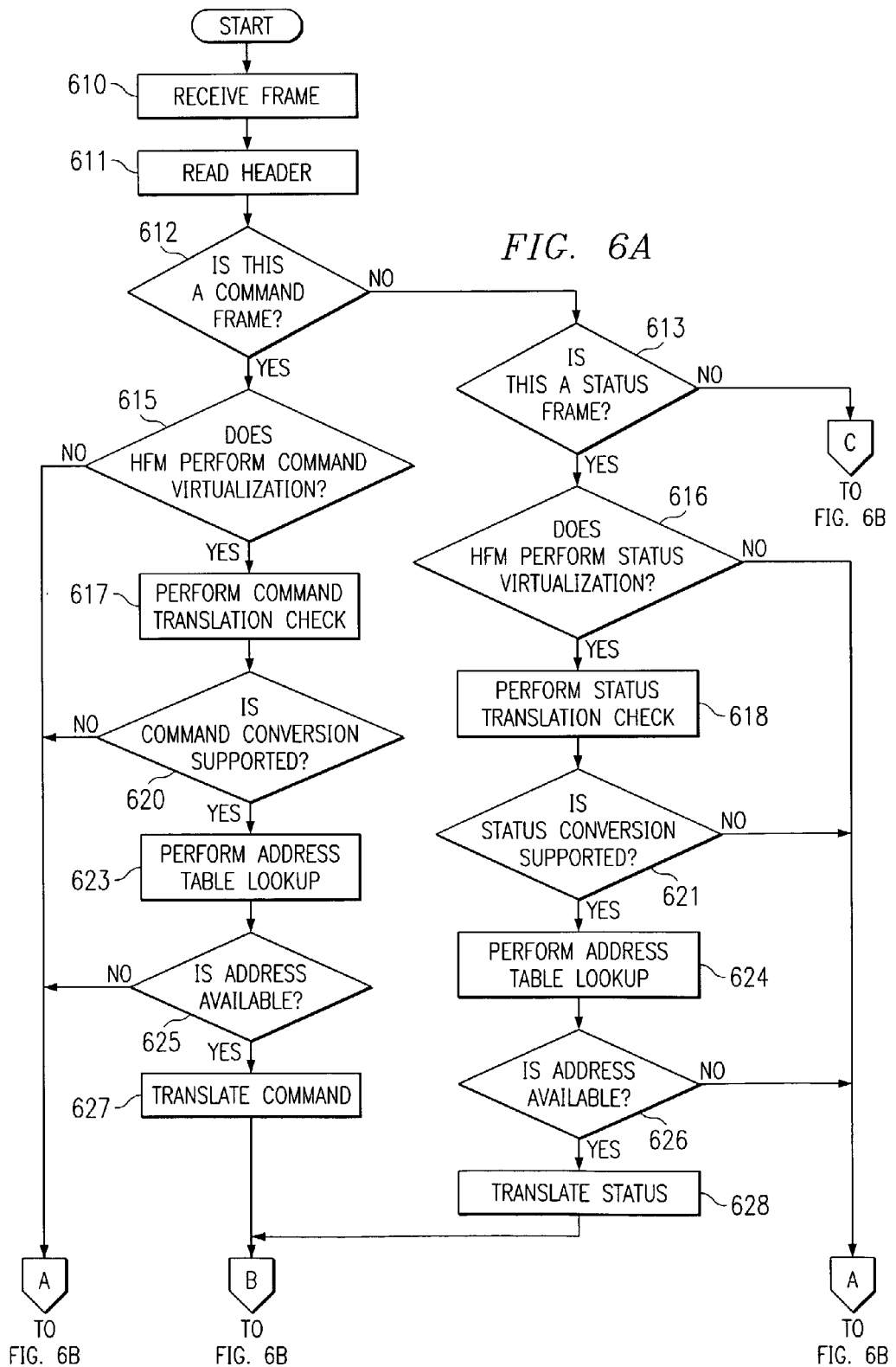
FIGS. 6A and 6B illustrate a flowchart outlining an exemplary operation of the present invention.
Figure 6B:
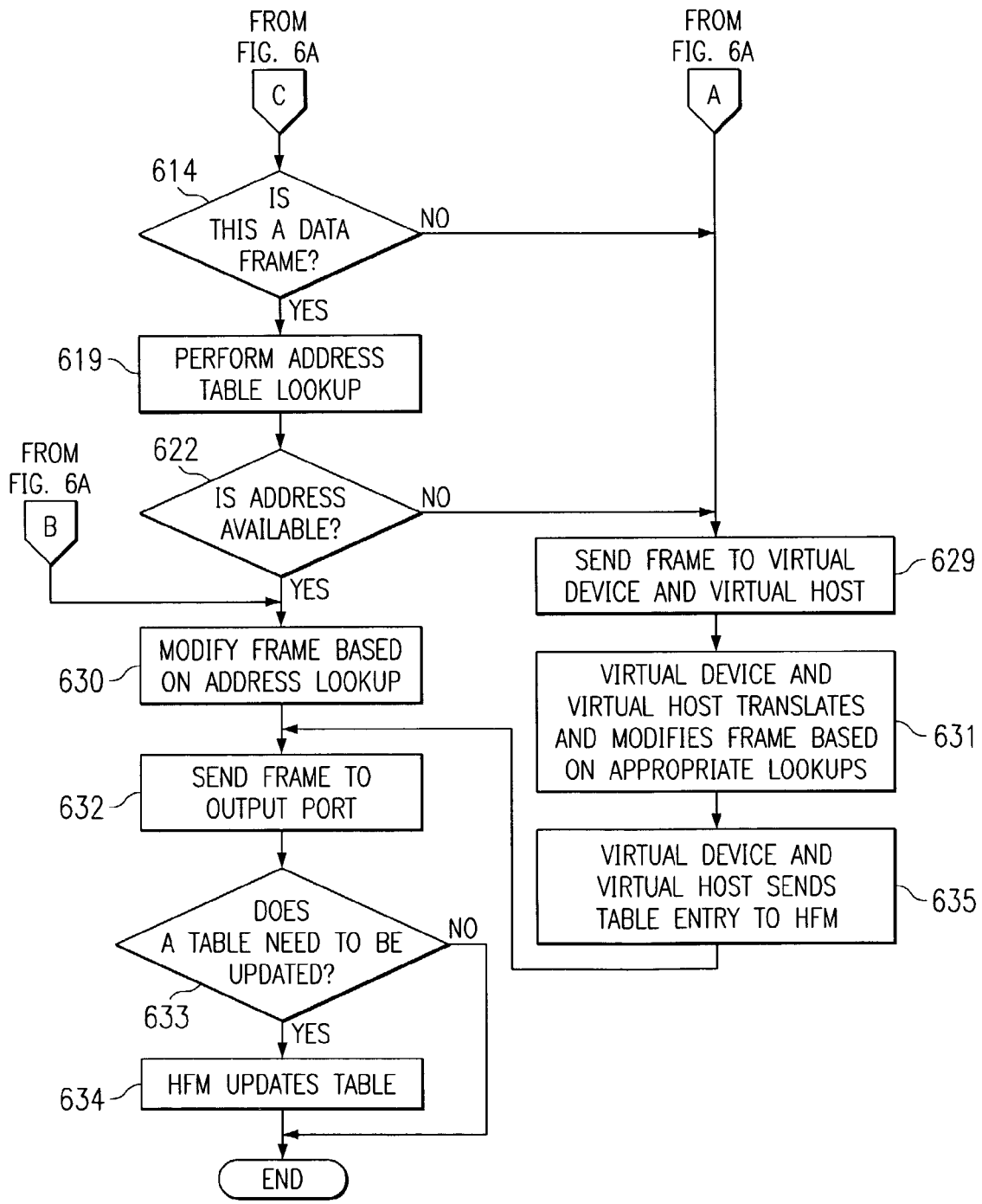

FIGS. 6A and 6B are a flowchart outlining an exemplary operation of the present invention when modifying a frame. As shown in FIGS. 6A and 6B, the operation starts with receipt of a frame (step 610). The frame header is read (step 611) and the received frame type is determined (steps 612–614). That is, a determination is made as to whether the frame header indicates that the frame is a command frame (step 612). If not, then a determination is made as to whether the frame is a status frame (step 613). If not, then a determination is made as to whether the frame is a data frame (step 614).

If the header indicates that the frame is a command frame (step 612), a determination is made as to whether the HFM has the capability to translate the command (step 615). If the HFM supports command translation, the HFM performs a command translation check (step 617). If the HFM is not capable of translating the command or the specific command cannot be translated, the HFM sends the frame to the virtual device and virtual host (step 629).

After it has been determined that the HFM performs command virtualization (step 615) and the command translation is checked (step 617), a determination is made as to whether command conversion is supported (step 620). If the HFM supports the specific command translation (step 620), the HFM performs an address table lookup (step 623) based on the address in the header. If the address is not available in the table (step 625), the HFM sends the frame to the virtual device and virtual host (step 629). Otherwise, the HFM translates the command (step 627), modifies the frame based on the address table lookup (step 630), and sends the frame to the output port (step 632).

If the header indicates that the frame is a status frame (step 613), the HFM decides if it has the capability to translate the status (step 616). If the HFM supports status translation, the HFM performs a status translation check (step 618). If the HFM is not capable of translating the status or the specific status can not be translated, the HFM sends the frame to the virtual device and virtual host (step 629). If the HFM supports the specific status translation (step 621), the HFM performs an address table lookup (step 624) based on the address in the header. If the address is not available in the table (step 626), the HFM sends the frame to the virtual device and virtual host (step 629). Otherwise, the HFM translates the status (step 628), modifies the frame based on the address table lookup (step 630), and sends the frame to the output port (step 632).

If the header indicates that the frame is a data frame (step 614), the HFM performs an address table lookup (step 619) based on the address in the header. If the address is not available in the table (step 622), the HFM sends the frame to the virtual device and virtual host (step 629). Otherwise, the HFM modifies the frame based on the address table lookup (step 630) and sends the frame to the output port (step 632).

If the header indicates that the frame is neither a command, a status, nor a data frame, the HFM sends the frame to the virtual device and virtual host (step 629). If the frame is sent to the virtual device and virtual host, the virtual device and virtual host performs the appropriate translation (step 631). The virtual device and virtual host sends a new table entry to the HFM (step 635). The virtual device and virtual host sends the frame to the output port and the HFM acts as a pass through device (step 632).

The HFM checks if a new table entry was received (step 633). If no new entry was received the operation ends. When the HFM receives a new table entry from the virtual device and virtual host, the HFM updates the table based on this new entry (step 634). That is, the HFM checks to see if the table entry is located in its table. If it is in the table, a least recently used algorithm is performed on the table. If the entry is missing from the table, the HFM adds the new entry to the table and performs a least recently used algorithm on the table. The new entry either replaces the oldest entry in the table or is placed in an unused entry location. After the table update, the operation ends. This operation may be repeatedly performed for each new frame received.

Thus, the present invention provides a hardware frame modifier apparatus and method for storage virtualization. A hardware based frame modifier apparatus is used to translate the logical storage device address of the data frames to a physical storage device address. Based on a mapping, the hardware based frame modifier modifies the frame headers to direct the data frames directly to the physical storage device without having to be sent to the virtual device/virtual host. In this way, the number of store and forward operations required to send data frames to, or read frames from, the physical storage devices is reduced. As a result, the amount of delay or latency in the operation is reduced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A hardware frame modifier apparatus, comprising:
a first port that receives a frame;
a frame cracker that reads frame header information of the frame and identifies a frame type and a destination address for the frame;
a frame modifier that modifies the frame based on the frame type to generate a modified frame;
a second port that outputs the modified frame;
a virtualization table storage device that stores a table of virtual address to physical address translations;

wherein the table stored in the virtualization table storage device is updated by a virtual device/virtual host device; and wherein if the table stored in the virtualization table storage device does not include an entry having the destination address, the frame is forwarded to the virtual device/virtual host device.

2. The hardware frame modifier apparatus of claim 1, wherein the frame modifier modifies the frame by replacing the destination address with an address determined from the virtualization table based on the destination address.

3. The hardware frame modifier apparatus of claim 1, wherein the frame type is a command frame and wherein the frame modifier modifies the command frame by translating the command frame to a modified command frame based on a command type.

4. The hardware frame modifier apparatus of claim 1, wherein a frame is received by the second port and is output on the first port without being modified by the frame modifier.

5. The hardware frame modifier apparatus of claim 1, wherein the hardware frame modifier apparatus is part of a hardware accelerator card.

6. The hardware frame modifier apparatus of claim 1, wherein the destination address is a virtual address of a storage device.

7. The hardware frame modifier apparatus of claim 1, wherein the first port is coupled to an interface converter and the second port is coupled to a hardware frame modifier interconnect.

8. A method of routing frames to a destination, comprising:
receiving the frame;
reading frame header information of the frame and identifying a frame type and a destination address for the frame;
modifying the frame based on the frame type to generate a modified frame;
outputting the modified frame;
looking up the destination address in a virtualization table storage device that stores a table of virtual address to physical address translations, wherein modifying the frame includes replacing the destination address with an address determined from the virtualization table based on the lookup of the destination address;
updating the table in the virtualization table storage device, wherein the table is updated by a virtual device/virtual host device; and
wherein if the table stored in the virtualization table storage device does not include an entry having the destination address, the frame is forwarded to the virtual device/virtual host device.

9. The method of claim 8, wherein the frame type is a command frame and wherein modifying the frame includes modifying the command frame by translating the command frame to a modified command frame based on a command type.

10. The method of claim 8, wherein the method is implemented by a hardware frame modifier apparatus of a hardware accelerator card.

11. The method of claim 8, wherein the destination address is a virtual address of a storage device.

12. A virtual storage system, comprising:
a host device;
a hardware frame modifier;
a storage device, wherein the hardware frame modifier receives frames from the host device, extracts frame header information including a frame type and destination address from the frames, modifies the frames based on the frame type, and forwards the modified frame to the storage device;
a virtualization table storage device that stores a table of virtual address to physical address translations;
wherein the table stored in the virtualization table storage device is updated by a virtual device/virtual host device; and
wherein if the table stored in the virtualization table storage device does not include an entry having the destination address, the frame is forwarded to the virtual device/virtual host device.

13. A computer readable medium having instructions stored thereon that are executable by a computer for routing frames to a destination, the computer readable medium further comprising:
first instructions for receiving the frame;
second instructions for reading frame header information of the frame and identifying a frame type and a destination address for the frame;
third instructions for modifying the frame based on the frame type to generate a modified frame;
fourth instructions for outputting the modified frame;
fifth instructions for looking up the destination address in a virtualization table storage device that stores a table of virtual address to physical address translations, wherein modifying the frame includes replacing the destination address with an address determined from the virtualization table based on the lookup of the destination address;
sixth instructions for updating the table in the virtualization table storage device, wherein the table is updated by a virtual device/virtual host device; and
seventh instructions for wherein if the table stored in the virtualization table storage device does not include an entry having the destination address, the frame is forwarded to the virtual device/virtual host device.

* * * * *